United States Patent
Wei

(10) Patent No.: US 12,138,547 B2
(45) Date of Patent: Nov. 12, 2024

(54) DISPLAY METHOD AND APPARATUS FOR VIRTUAL SCENE, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Chenglong Wei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 239 days.

(21) Appl. No.: 17/748,609

(22) Filed: May 19, 2022

(65) Prior Publication Data
US 2022/0274021 A1 Sep. 1, 2022

Related U.S. Application Data

(63) Continuation of application No. PCT/CN2021/090087, filed on Apr. 27, 2021.

(30) Foreign Application Priority Data

May 13, 2020 (CN) .......................... 202010404442.8

(51) Int. Cl.
*A63F 13/63* (2014.01)
*A63F 13/27* (2014.01)
(Continued)

(52) U.S. Cl.
CPC .............. *A63F 13/63* (2014.09); *A63F 13/27* (2014.09); *A63F 13/577* (2014.09); *A63F 13/65* (2014.09);
(Continued)

(58) Field of Classification Search
CPC ........ A63F 13/63; A63F 13/27; A63F 13/577; A63F 13/65; A63F 13/69; A63F 13/822;
(Continued)

(56) References Cited

U.S. PATENT DOCUMENTS 11,224,814 B2 1/2022 Wu et al.
2007/0200855 A1 8/2007 Minagawa
(Continued)

FOREIGN PATENT DOCUMENTS

CN 103729558 A 4/2014
CN 104778223 A 7/2015
(Continued)

OTHER PUBLICATIONS

Monster Hunter world: Iceborne Official Web Manual, 2018-2019, https://game.capcom.com/manual/MHW_PC/en/steam/page/16/2#_, https://game.capcom.com/manual/MHW_PC/en/steam/page/2/4, and https://game.capcom.com/manual/MHW_PC/en/steam/page/13/1 (Year: 2019).*

(Continued)

*Primary Examiner* — Kevin Y Kim
(74) *Attorney, Agent, or Firm* — ANOVA LAW GROUP PLLC

(57) ABSTRACT

A display method for a virtual scene includes: displaying a virtual scene in which a first virtual operation object is located; when the first virtual operation object moves from an exterior of a first area to an interior of the first area, loading, in the virtual scene, virtual model objects currently present in a target area, the target area being located in the interior of the first area, and the target area being configured to allow multiple virtual operation objects to edit virtual model objects in the target area; and displaying a first group of virtual model objects located within a visual range of the first virtual operation object in the target area.

20 Claims, 9 Drawing Sheets

(51) Int. Cl.
  *A63F 13/577* (2014.01)
  *A63F 13/65* (2014.01)
  *A63F 13/69* (2014.01)
  *A63F 13/822* (2014.01)
  *A63F 13/837* (2014.01)

(52) U.S. Cl.
  CPC ............ *A63F 13/69* (2014.09); *A63F 13/822* (2014.09); *A63F 13/837* (2014.09); *A63F 2300/8082* (2013.01)

(58) Field of Classification Search
  CPC ........ A63F 13/837; A63F 13/42; A63F 13/50; A63F 2300/8082; A63F 2300/807; A63F 2300/8076
  See application file for complete search history.

(56) References Cited

U.S. PATENT DOCUMENTS

| | | |
|---|---|---|
| 2013/0065694 A1 | 3/2013 | Kim et al. |
| 2015/0165323 A1 | 6/2015 | Major et al. |
| 2019/0107991 A1 | 4/2019 | Spivack et al. |
| 2019/0251717 A1 | 8/2019 | Liu et al. |
| 2019/0275429 A1 | 9/2019 | Yang et al. |
| 2019/0279432 A1 | 9/2019 | Lin |
| 2021/0185105 A1 | 6/2021 | Van Wie et al. |

FOREIGN PATENT DOCUMENTS

| | | |
|---|---|---|
| CN | 108434739 A | 8/2018 |
| CN | 108510597 A | 9/2018 |
| CN | 110262730 A | 9/2019 |
| CN | 110681158 A | 1/2020 |
| CN | 110935169 A | 3/2020 |
| CN | 111318014 A | 6/2020 |
| CN | 111558221 A | 8/2020 |
| JP | 2002315969 A | 10/2002 |
| JP | 2007222310 A | 9/2007 |
| JP | 2020507101 A | 3/2020 |
| KR | 20130010911 A | 1/2013 |

OTHER PUBLICATIONS

Enricofairme, How to Decorate Your Room in Monster Hunter World Iceborne, Sept 6, 2019, https://holdtoreset.com/how-to-decorate-your-room-in-monster-hunter-world-iceborne/ (Year: 2019).*

Monster Hunter World Iceborne, Update Ver. 11.50.00 Outline, Feb. 6, 2020, https://www.monsterhunter.com/update/mhw-steam/us/ver11_50.html (Year: 2020).*

The Japan Patent Office (JPO) Notification of Reasons for Refusal for Application No. 2022-537184 and Translation Dec. 4, 2023 7 Pages.

Korean Intellectual Property Office (KIPO) Office Action 1 for 20227010138 Feb. 7, 2024 12 Pages (including translation).

The Japan Patent Office (JPO) Notification of Reasons for Refusal for Application No. 2022-537184 and Translation Jun. 5, 2023 6 Pages.

China National Intellectual Property Administration (CNIPA) Office Action 1 for 20201040442.8 Dec. 8, 2020 13 Pages (including translation).

The World Intellectual Property Organization (WIPO) International Search Report for PCT/CN2021/090087 Jul. 27, 2021 7 Pages (including translation).

Qi Qi Le, "can you share a room after getting married and decorate a house together?" Fantasy Journey to the West Mobile Game Official Website (77L.com), Jul. 22, 2015, Retrieved from the Internet:URL: http://www.771.com/News/gonglue/48797.html. 6 pages.

* cited by examiner

DISPLAY METHOD AND APPARATUS FOR VIRTUAL SCENE, STORAGE MEDIUM, AND ELECTRONIC DEVICE

CROSS-REFERENCES TO RELATED APPLICATIONS

This application is a continuation application of PCT Patent Application No. PCT/CN2021/090087, entitled "VIRTUAL SCENE DISPLAY METHOD AND APPARATUS, STORAGE MEDIUM, AND ELECTRONIC DEVICE" and filed on Apr. 27, 2021, which claims priority to Chinese Patent Application No. 202010404442.8, entitled "DISPLAY METHOD AND APPARATUS FOR VIRTUAL SCENE, STORAGE MEDIUM, AND ELECTRONIC DEVICE" filed with the China National Intellectual Property Administration on May 13, 2020, the entire contents of both of which are incorporated herein by reference.

FIELD OF THE TECHNOLOGY

This application relates to the field of image processing technologies, in particular to the field of games, and specifically, to a display method and an apparatus for a virtual scene, a storage medium, and an electronic device.

BACKGROUND OF THE DISCLOSURE

Presentation of virtual scenes is involved in many cases. In some cases, virtual operation objects exist in the virtual scenes, and the virtual operation objects can be custom designed. For example, in virtual scenes of some games, players (that is, virtual characters in virtual game scenes) can arrange virtual items in their private areas. For example, the players plant trees in their private homes and put some decorations on the trees to build their homes freely in the virtual scenes of the games.

In related technologies, a separate private scene needs to be created temporarily, virtual operation objects can only perform custom design in the temporary private scene, and the content of these custom designs is not displayed in areas in which interaction is allowed. In order to view a design of a virtual operation object, the system needs to provide an exclusive entrance. The private scene temporarily created by the virtual operation object can be entered and viewed only after the exclusive entrance is triggered. Therefore, there are limitations in the existing related technologies.

SUMMARY

A display method and an apparatus for a virtual scene, a storage medium, and an electronic device are provided according to various embodiments of this application.

According to an aspect of the embodiments of this application, a display method for a virtual scene is provided. The method is performed by an electronic device, and includes: displaying a virtual scene in which a first virtual operation object is located; when the first virtual operation object moves from an exterior of a first area to an interior of the first area, loading, in the virtual scene, virtual model objects currently present in a target area, the target area being located in the interior of the first area, and the target area being configured to allow multiple virtual operation objects to edit virtual model objects in the target area; and displaying a first group of virtual model objects located within a visual range of the first virtual operation object in the target area.

According to another aspect of the embodiments of this application, a display apparatus for a virtual scene is further provided. The apparatus includes a memory and a processor, the memory storing computer-readable instructions. The processor is configured, when executing the computer-readable instructions, to: display a virtual scene in which a first virtual operation object is located; when the first virtual operation object moves from the exterior of a first area to the interior of the first area, load, in the virtual scene, virtual model objects currently present in a target area, the target area being located in the interior of the first area, and the target area being configured to allow multiple virtual operation objects to edit virtual model objects in the target area; and display, a first group of virtual model objects located within a visual range of the first virtual operation object in the target area.

According to still another aspect of the embodiments of this application, one or more non-transitory computer-readable storage media are further provided, including computer-readable instructions stored therein. The computer-readable instructions are configured to, when being executed by a processor, cause the processor to implement the foregoing display method for a virtual scene.

Details of one or more embodiments of this application are provided in the accompanying drawings and descriptions below. Based on the specification, the accompanying drawings, and the claims of this application, other features, objectives, and advantages of this application become clearer.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

In order to make persons skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

It should be noted that in this specification, claims, and accompanying drawings of this application, the terms "first", "second", and the like are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In order to better understand the embodiments provided in this application, some of the terms are explained as follows:

MMORPG: the acronym of Massive (Massively) Multiplayer Online Role-Playing Game.

Free construction: players can freely choose a large number of models with different performance, and put various models together and build them to change a public scene in a game. Free construction is a type of custom processing with a high degree of freedom.

Dynamic blocking: a processing mechanism ensuring that, when model data in a scene is changed in real time, collision changes brought by model shape changes can be experienced simultaneously by controlled characters in the game. For example, as a model in the scene changes, a bounding box of a character can move to a position that collides with a bounding box of the model, whereas the position may not collide with the bounding box of the model before such change occurs. The dynamic blocking ensure such change can be reflected correctly, and a collision effect can be shown, e.g., the character cannot move into or pass through the bounding box of the model, a status of the character changes as the collision occurs, etc.

Figure 1:
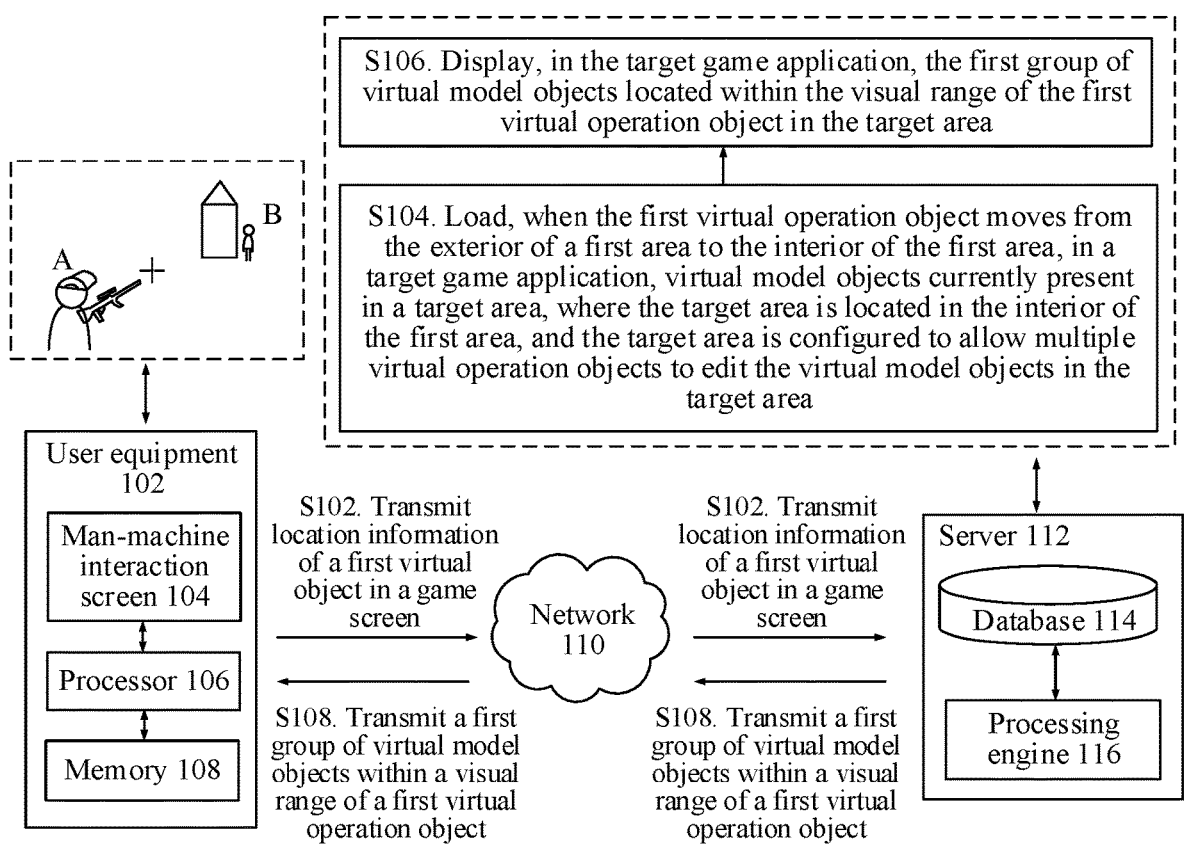
FIG. 1 is a schematic diagram of an application environment of a display method for a virtual scene according to an embodiment.

According to an aspect of the embodiments of this application, a display method for a virtual scene is provided. In an embodiment, the display method for a virtual scene may be, but is not limited to, applied in an environment as shown in FIG. 1. The hardware environment may include, but is not limited to, a user equipment 102, a network 110, and a server 112. There is a game client, used for a virtual operation object to edit a virtual scene in a game scene, running in the user equipment 102.

The user equipment 102 may include, but is not limited to: a man-machine interaction screen 104, a processor 106, and a memory 108. The man-machine interaction screen 104 is configured to obtain man-machine interaction instructions via a man-machine interaction interface, and is further configured to present a game screen in a game task; and the processor 106 is configured to respond to the man-machine interaction instruction, and control a virtual operation character on performing a specified operation to complete editing a virtual model object in the virtual scene. The memory 108 is configured to store attribute information of a first virtual operation object, the virtual model object, and attribute information of a first group of virtual model objects. The server may include, but is not limited to: a database 114 and a processing engine 116. The processing engine 116 is configured to invoke attribute information of a first area and a second area stored in the database 114; load, when the first virtual operation object moves from the exterior of the first area to the interior of the first area, in a target game application, virtual model objects currently present in a target area. The target area is located in the interior of the first area, and the target area is configured to allow multiple virtual operation objects to edit virtual model objects in the target area. In the target game application, the first group of virtual model objects located within a visual range of the first virtual operation object are displayed in the target area, thereby enabling the multiple virtual operation objects to edit the virtual model objects in the target area in the target game application, and displaying a virtual simulation object in the target area according to the location of the virtual operation objects, thus significantly improving freedom and exposure of the virtual operation objects in editing the virtual model objects in the target area. In this way, the technical problem in the existing technology that a virtual operation object must create its own private scene and edit the virtual model object in the virtual scene is resolved.

It can be understood that, in an exemplary embodiment, an operation (e.g., movement, edit operation, attack, etc.) of a virtual operation object is obtained according to a user input on the user equipment 102 that displays an interactive interface of the game client. The operation of the virtual operation object is transmitted by the user equipment to the server 112. Different user equipment 102 may transmit operations of different virtual operation objects to the server 112. The server 112 processes the operations, updates game data according to the operations, and sends the updated game data to different user equipment 102. In this way, an operation result of a first virtual operation object performed on a first user equipment 102 can be reflected on the interactive interface of the game client on a second user equipment 102, e.g., when the first virtual operation object and/or a virtual model object affected by the operation of the first virtual operation object is located in a visual range of a second virtual operation object corresponding to the second user equipment 102. A user equipment corresponding to a virtual operation object may refer to a device that executes a game client and logged in with a user account that allows a user of the device to control the virtual operation object.

In some embodiments, a visual range of a virtual operation object may refer to a range of a game scene that is presented by a display device of the user equipment 102 corresponding to the virtual operation object. As a player controls the virtual operation object to move in the game environment, the game scene may change accordingly. In some embodiments, a visual range of a virtual operation object may be a preset range defined in the game environment relative to the virtual operation object, for example, a circular range with a preset radius with the virtual operation object as the center.

In some embodiments, the process includes the following: the man-machine interaction screen 104 in the user equipment 102 displays an interactive interface of the game client running a game task (FIG. 1 shows a shooting game, in which a target virtual character is sniping a distant target object.). As in steps S102 to S108, obtain location information of the first virtual operation object, and transmit the location information to the server 112 via the network 110. The server 112 loads, when the first virtual operation object moves from the exterior of the first area to the interior of the first area, in a target game application, the virtual model objects currently present in the target area, where the target area is located in the interior of the first area, and the target area is configured to allow multiple virtual operation objects to edit the virtual model objects in the target area; and in the target game application, the first group of virtual model objects located within the visual range of the first virtual operation object in the target area is determined to be displayed. Then a result determined above (e.g., information related to the target area and the first group of virtual model objects) is returned to the user equipment 102.

Then, as in steps S102 to S108, the user equipment 102 obtains the location information of the first virtual operation object according to a game screen displaying the first virtual operation object in the target game application, and loads, when the first virtual operation object moves from the exterior of the first area to the interior of the first area, in the target game application, the virtual model objects currently present in the target area, where the target area is located in the interior of the first area, and the target area is configured to allow the multiple virtual operation objects to edit the virtual model objects in the target area; and displays, in the target game application, the first group of virtual model objects located within the visual range of the first virtual operation object in the target area. In this way, the multiple virtual operation objects can edit the virtual model objects in the target area in the target game application, and a virtual simulation object in the target area can be displayed according to the location of the virtual operation object, thus significantly improving freedom and exposure of the virtual operation objects in editing the virtual model objects in the target area, enhancing participation enthusiasm and technical effects of players, and further resolving the technical problem in the existing technology that a virtual operation object must create its own private scene and edit the virtual model object in the virtual scene.

In an embodiment, the user equipment 102 may be a user equipment provided with a target client and may include, but is not limited to, at least one of the following: a cell phone (such as an Android phone, an iOS phone, and the like), a notebook computer, a tablet computer, a palmtop computer, a mobile Internet device (MID), a PAD, a desktop computer, a smart TV, and the like. The target client may be a game client and the like. The network may include, but is not limited to, a wired network and a wireless network. The wired network includes: a local area network, a metropolitan area network, and a wide area network. The wireless network includes: Bluetooth, Wi-Fi, and other networks implemented based on wireless communications. The server may be an independent server, a server cluster including multiple servers, or a cloud server. The foregoing description is merely an example, and this is not limited in this embodiment.

Figure 2:
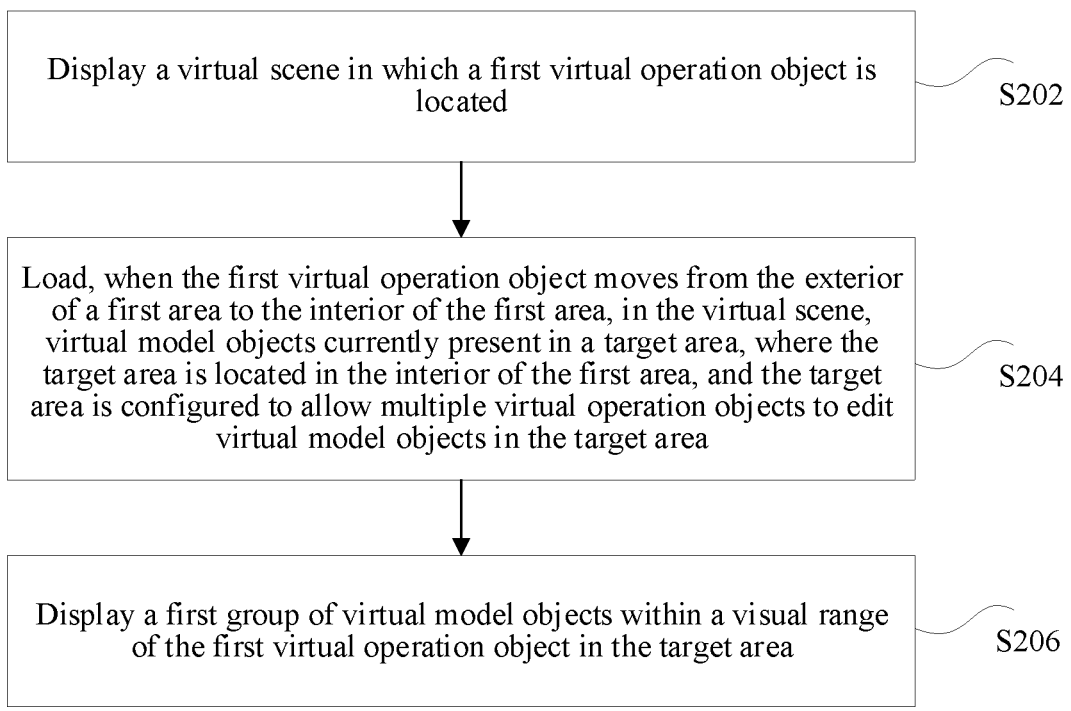
FIG. 2 is a flowchart of a display method for a virtual scene according to an embodiment.

In an embodiment, as shown in FIG. 2, the foregoing display method for a virtual scene includes the following steps.

Step S202. Display a virtual scene in which a first virtual operation object is located.

In an embodiment, the method may be applied in a virtual game scene, so any relevant display can all be displayed through a target game application (that is, displayed in the target game application). Therefore, an electronic device can display, in the target game application, a game screen displaying the first virtual operation object. It is to be understood that the game screen is a virtual scene.

Step S204. Load, when the first virtual operation object moves from the exterior of a first area to the interior of the first area, in the virtual scene, virtual model objects currently present in a target area, where the target area is located in the interior of the first area, and the target area is configured to allow multiple virtual operation objects to edit virtual model objects in the target area.

In an embodiment, the target area is a public area in which interaction can occur, but is not a separate, private space or area of a certain virtual operation object.

The virtual model object is a virtual model that can be edited and designed, for example, a virtual article or a virtual item such as a virtual plant in a virtual game scene.

The virtual operation object is a virtual character capable of performing a series of operations in the virtual scene. For example, a player in the virtual game scene belongs to the virtual operation object, which can edit a virtual item with editing permissions. The operations that can be performed by the virtual operation object are not limited to editing virtual model objects. The virtual operation object can also perform other operations, for example, interact with other virtual operation objects in the virtual scene. Taking a virtual game scene as an example, different players can interact with each other in a virtual game scene, for example, attack or assist each other.

Step S206. Display a first group of virtual model objects located within a visual range of the first virtual operation object in the target area.

In an embodiment, the display method for a virtual scene may but not necessarily need multiple virtual operation objects to edit the virtual model objects in the target area, that is, multiple players may control multiple virtual operation objects in designing the virtual scene in the target area. For example, player 1 adds a virtual tree at a target location in the target area by controlling a virtual operation object 1, and player 2 adds virtual grass at a target location in the target area by controlling a virtual operation object 2. The target area may be divided into subareas, that is, subarea 1 and subarea 2, where the virtual operation object 1 may only edit a virtual scene in the subarea 1 with configuration permissions, and the virtual operation object 2 may only edit a virtual scene in the subarea 2 with configuration permissions.

That is, there is a public area in the target game application. The area is divided into multiple subareas. Each virtual operation object has, in the public area, a certain subarea in which a virtual scene can be built, and the virtual operation object is allowed, in the public area, to configure a virtual model object in the subarea that is designed by the virtual operation object, such as planting a virtual tree in the subarea.

Loading, when a first virtual operation object moves from the exterior of a first area to the interior of the first area, in a target game application, virtual model objects currently present in a target area may be understood as loading, when a virtual operation object 3 moves from the exterior of an area A to the interior of the area A, in the target game application, the virtual model objects currently present in the target area, and displaying, in the target game application, a group of virtual model objects within a visual range of the virtual operation object 3, where the target area is located in the interior of the area A.

In other words, only when the virtual operation object 3 is located in the interior of a second area can the virtual model objects currently present in the target area be loaded, so as to avoid a large amount of data processing caused by the virtual model objects in the target area are in the state of data displaying all the time. The virtual model objects currently present may be understood as virtual model objects that can be edited in the target area corresponding to the moment of the location of the first virtual operation object.

In an embodiment, the target area is divided into N target subareas, where N is a positive integer greater than 1; and each target subarea of the N target subareas is configured to allow a corresponding virtual operation object to edit a virtual model object in the target subarea.

The target game application may include, but is not limited to, the foregoing game application, and may also be a Multiplayer Online Battle Arena (MOBA) or a Single-Player Game (SPG). Types of the game application may include, but are not limited to, at least one of the following: a two-dimensional (2D) game application, a three-dimensional (3D) game application, a virtual reality (VR) game application, an augmented reality (AR) game application, and a mixed reality (MR) game application. The foregoing description is merely an example, and this is not limited in this embodiment.

Figure 3:
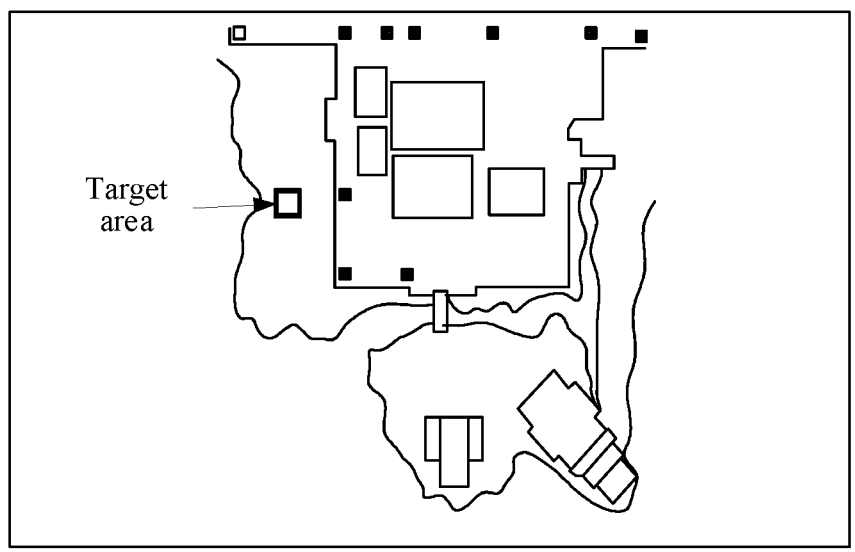
FIG. 3 is a flowchart of a display method for a virtual scene according to an embodiment.

In a practical application, FIG. 3 is a schematic diagram of a target area displaying in a target game application. A black block in FIG. 3 is the target area in which multiple virtual operation objects are allowed to arrange virtual models. The target area is divided into multiple subareas, and each subarea allows one corresponding virtual operation object to arrange a virtual model therein. In a public scene of a game, multiple virtual operation objects are allowed to edit virtual model objects in their respective homes.

Figure 4:
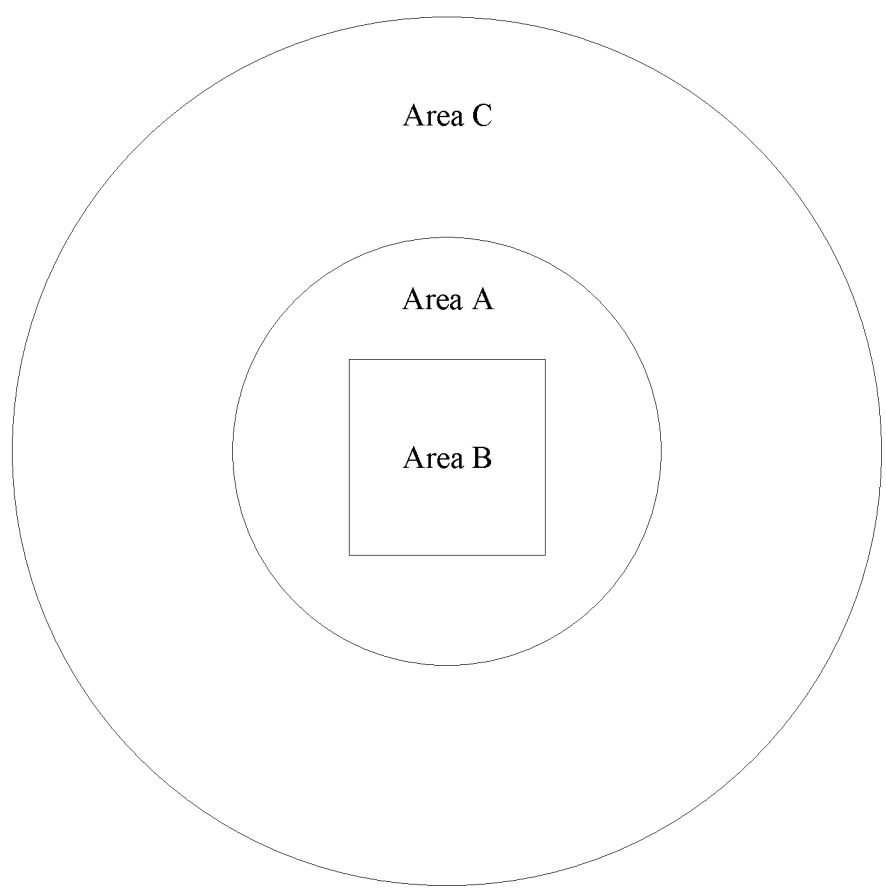
FIG. 4 is a schematic diagram of a positional relationship between areas according to an embodiment.

FIG. 4 shows a schematic diagram of a positional relationship between areas. An area A (that is, a first area) is located in an area C (that is, a second area), and an area B (that is, a target area) is located in the area A. When a virtual object moves from the exterior of the area A to the interior of the area A, in a target game application, virtual model objects currently present in the area B are loaded. A virtual operation object, when passing through the area B, will have an immersive experience, that is, the virtual operation object has a better sense of immersion. When the virtual operation object is located in the interior of the area A, the virtual model objects currently present will be loaded in the area B, so that the virtual operation object can sense a virtual scene in the area B without delay wherever it goes in the area B.

In an embodiment, the first area is located in the second area. After displaying, in the target game application, a first group of virtual model objects located within a visual range of a first virtual operation object in the target area, the method may further include:

retaining, when the first virtual operation object leaves the interior of the first area and is located in the interior of the second area, loaded target loading data, where the target loading data is loading data obtained by loading the virtual model objects currently present in the target area.

When a virtual operation object a is located in the interior of the area A, the virtual model objects currently present will be loaded in the area B, so that the virtual operation object a will sense a virtual scene in the area B without delay wherever it goes in the area B. This improves the sense of immersion of the virtual operation object a.

According to the embodiments of this application, the method includes: displaying a virtual scene in which a first virtual operation object is located; when the first virtual operation object moves from the exterior of a first area to the interior of the first area, loading, in the virtual scene, virtual model objects currently present in a target area, where the target area is located in the interior of the first area, and the target area is configured to allow multiple virtual operation objects to edit virtual model objects in the target area; and displaying, in the virtual scene, a first group of virtual model objects located within a visual range of the first virtual operation object in the target area. That is, without the need for the virtual operation object to create its own separate private scene, the multiple virtual operation objects can edit the virtual model objects in the target area in a normal interactive virtual scene, and display virtual simulation objects in the target area according to the locations of the virtual operation objects. This significantly simplifies processing, enhances freedom and exposure of the virtual operation objects in editing the virtual model objects in the target area, and avoids limitations, so as to avoid loss of system resources caused by complex processing. In addition, system resources needed to create an additional separate private scene are also saved.

According to the embodiments of this application, editing, by a player, a virtual model object in a public scene in a game is also supported. In this way, the following technical effects can be achieved: first, give a player a high degree of freedom, because the performance in a public scene can be changed by the player, realizing custom processing, and avoiding limitations; second, all passerby characters passing by in the public scene can see and sense changes of the scene in real time, significantly enhancing exposure and conspicuousness, and dynamically enriching display content of the virtual scene in the public scene.

In an embodiment, the first area is located in the second area. After displaying, in the target game application, a group of virtual model objects located within a visual range of a first virtual operation object in the target area, the method may include:

deleting, when the first virtual operation object moves to the exterior of the second area, target loading data, where the target loading data is loading data obtained by loading the virtual model objects currently present in the target area.

In this embodiment, when the virtual operation object a leaves a range in which the target area B is located, the target loading data is deleted, so that the memory overhead is reduced.

In an embodiment, after displaying, in the target game application, a group of virtual model objects located within a visual range of a first virtual operation object in the target area, the method may further include:

when the first virtual operation object is located in the interior of the first area and the virtual model object in the target area is updated by a second virtual operation object (e.g., such update is detected by a user equipment corresponding to the second virtual operation object and transmitted to the server, and the server sends data related to such update to a user equipment corresponding to the first virtual operation object), loading the updated virtual model object in the target area, or, reloading the virtual model objects currently present in the target area, where the second virtual operation object includes one or more virtual operation objects; and displaying a second group of virtual model objects, where the second group of virtual model objects includes virtual model objects in the target area (i.e., an area in which the updated virtual model object is located), and located within the visual range of the first virtual operation object.

In this embodiment, the virtual model object updated by the second virtual operation object in the target area is recorded. The first virtual operation object can sense the current scene information in the target area in real time.

In an embodiment, the first area is located in the second area. After displaying, in the target game application, a first group of virtual model objects located within a visual range of a first virtual operation object in the target area, the method may further include:

retaining, after the virtual model object in the target area is updated by a third virtual operation object, loaded target loading data if the first virtual operation object is located in the exterior of the first area and the interior of the second area, where the target loading data is loading data obtained by loading the virtual model objects currently present in the target area; and displaying a third group of virtual model objects, where the third group of virtual model objects includes virtual model objects in the target area before the updating (e.g., the virtual model objects in the target area does not reflect the update made by the third virtual operation object) and located within the visual range of the first virtual operation object.

In a solution according to an embodiment, the method further includes: detecting, when the first virtual operation object moves from the exterior of the target area to the interior of the target area, whether the first virtual operation object has editing permissions for the target area;

displaying, when the first virtual operation object has editing permissions for the target area, a first area arrangement interface, where the first area arrangement interface is configured to allow the first virtual operation object, in the first area arrangement interface, to edit the virtual model object in the target area;

obtaining, in the first area arrangement interface, a first edit instruction of the first virtual operation object; and updating, in response to the first edit instruction, the virtual model objects currently present in the target area to a first virtual model object set.

After updating the virtual model objects currently present in the target area to a first virtual model object set, the method may include:

displaying, after the first virtual operation object completes editing the virtual model object in the target area, a fourth group of virtual model objects, where the fourth group of virtual model objects includes virtual model objects in the first virtual model object set and located within the visual range of the first virtual operation object.

In an embodiment, the method further includes: when the first virtual operation object is located in the interior of the first area and the first virtual model object set in the target area is updated to a second virtual model object set by a fourth virtual operation object, loading one or more virtual model objects in the target area that have been updated by the fourth vertical operation object (e.g., the loaded one or more virtual model objects may be a subset of the second virtual model object set, virtual model objects that remain the same in the first/second virtual model object set, i.e., before and after such update, are not loaded), or, reloading the second virtual model object set currently present in the target area; and displaying a fifth group of virtual model objects, where the fifth group of virtual model objects includes virtual model objects in the second virtual model object set and located within the visual range of the first virtual operation object.

In an embodiment, the first area is located in the second area. When the first virtual operation object moves from the exterior of the second area to the interior of the second area, collision data in the target area is loaded, where the collision data is used to represent a collision area of the virtual model objects currently present in the target area.

Figure 5:
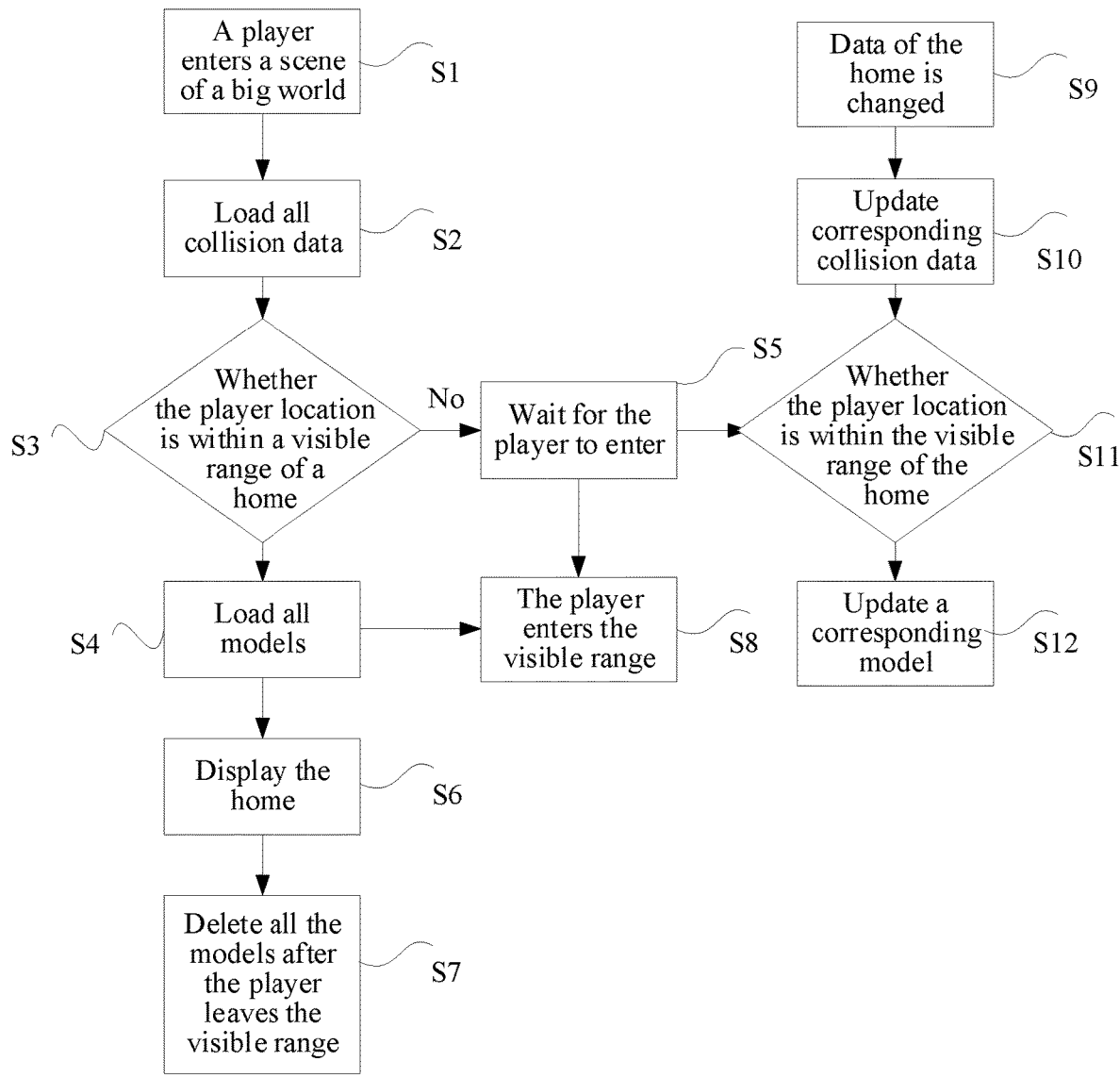
FIG. 5 is a flowchart of a method for free construction of a public scene based on a 3D big world MMORPG according to an embodiment.

In an embodiment, this application further provides a method for free construction of a public scene based on a 3D big world MMORPG according to an embodiment. FIG. 5 is a flowchart of a method for free construction of a public scene based on a 3D big world MMORPG according to an embodiment.

Figure 6:
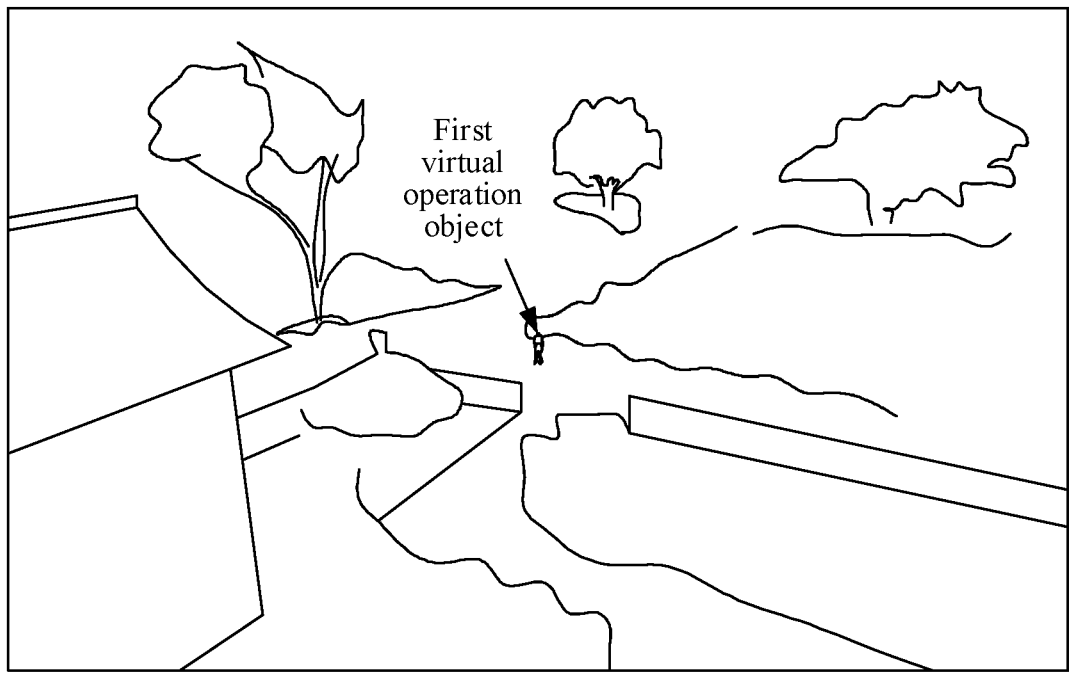
FIG. 6 is a schematic diagram of a virtual scene displayed after a player enters a scene of a big world according to an embodiment.

Step S1. A player enters a scene of the big world;

The player logs into a target game application with a game account, controls a virtual operation object in the target game, and enters the scene of the big world, that is, the player enters a target area. FIG. 6 is a schematic diagram of a virtual scene displayed after a player enters a scene of the big world.

Before the player enters the scene of the big world, the game system allocates an editable area (equivalent to the target area, which may be of any size) as shown in FIG. 3 from various large public scenes. The system may allocate an editable target area of any size from the various large public scenes, and the target area supports simultaneously online editing, by multiple players, a virtual model object.

Permissions to land arrangement in the virtual scene are granted to the player by certain means. A player with the permissions can arrange a variety of models after entering the area.

Step S2. Load all collision data;

In some embodiments, the collision data is processed using a dynamic blocking manner, that is, a client separately processes collision-related updates and display-related updates, thereby ensuring correctness of logic of the big world home and efficiency of rendering.

Figure 7:
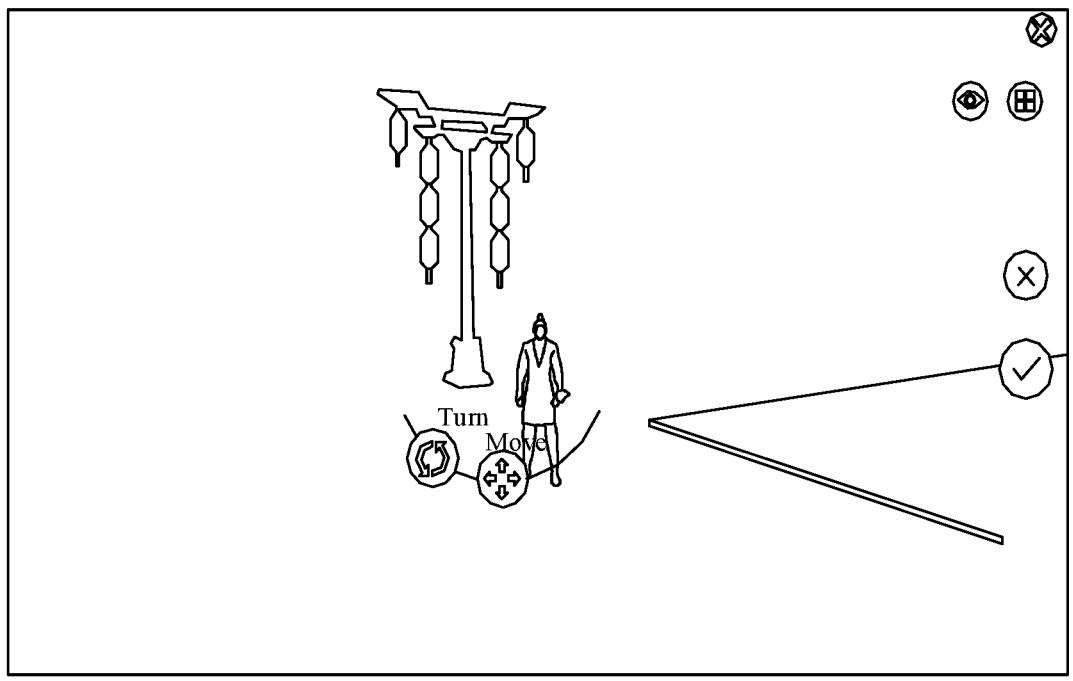
FIG. 7 is a schematic diagram of an arrangement of a public scene according to an embodiment.
Figure 8:
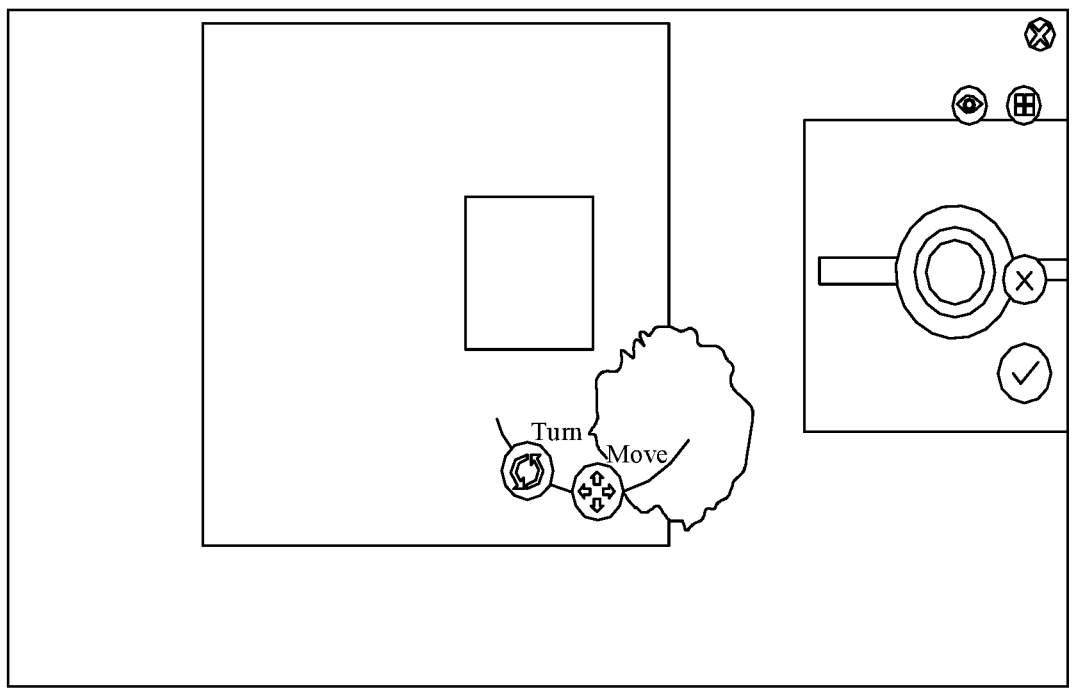
FIG. 8 is a schematic diagram of an arrangement of a public scene according to another embodiment.
Figure 9:
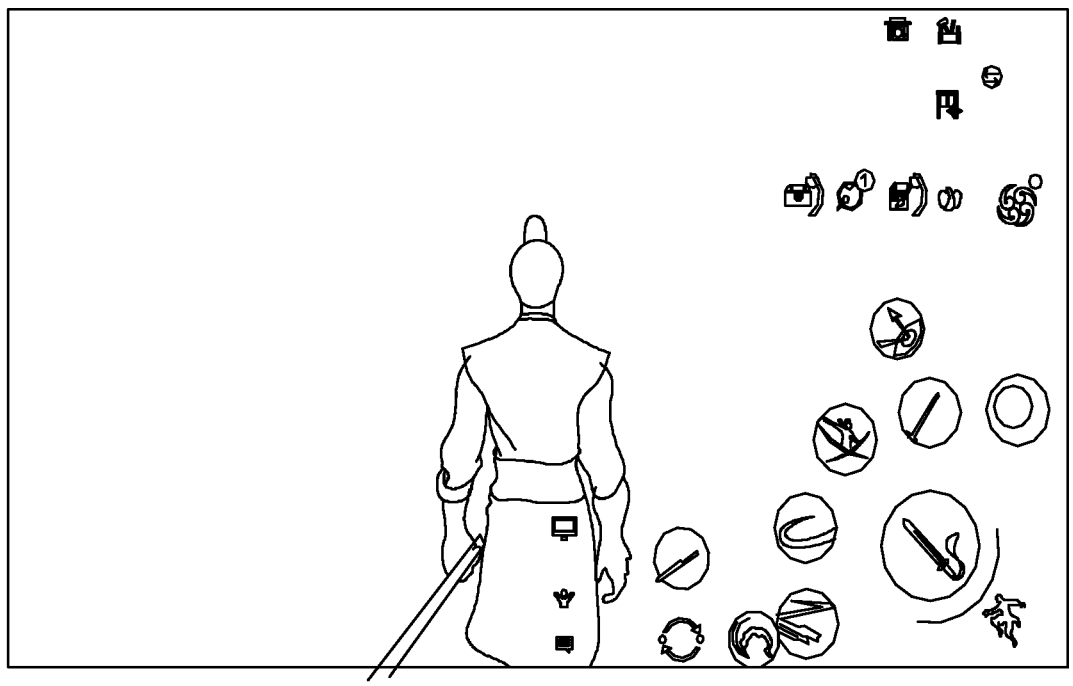
FIG. 9 is a schematic diagram of a final scene effect of a public scene arrangement according to an embodiment.
Figure 10:
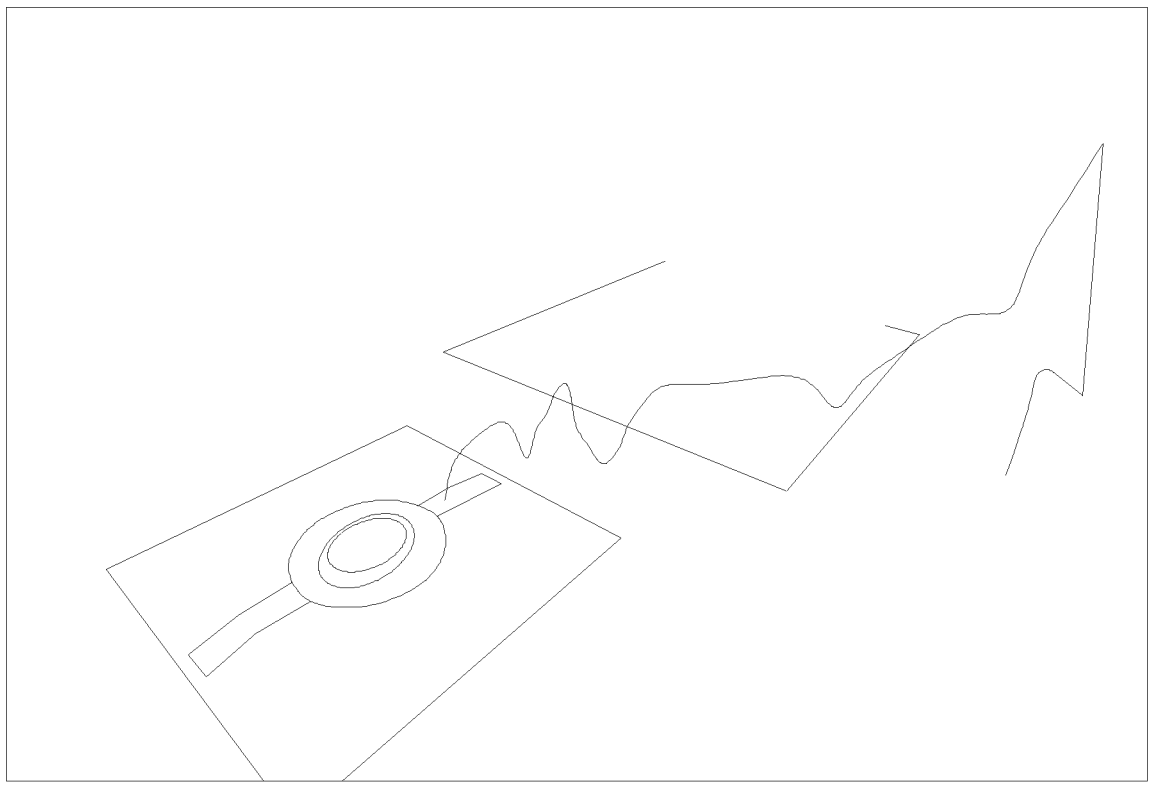
FIG. 10 is a schematic diagram of a final scene effect of a public scene arrangement according to another embodiment.

Step S3. Determine whether the player location is within a visible range of the home, if yes, perform step S4, and if no, perform step S5;

Step S4. Load all models;

Step S5. Wait for the player to enter;

Step S6. Display the home;

Step S7. Delete all the models after the player leaves the visible range;

Step S8. Perform step 4 when the player enters the visible range;

Step S9. Data of the home is changed;

The player, when entering a home with arrangement permissions in a public scene, can arrange the home according to the virtual model objects. FIG. 7 is a schematic diagram (I) of an arrangement of a public scene, FIG. 8 is a schematic diagram (II) of an arrangement of a public scene, FIG. 9 is a schematic diagram (I) of a final scene effect of the public scene arrangement, and FIG. 10 is a schematic diagram (II) of a final scene effect of the public scene arrangement.

Step S10. Update the corresponding collision data;

Step S11. Determine whether the player location is within the visible range of the home, if yes, perform step S12, and if no, perform step S5; and Step S12. Update a corresponding model.

According to the embodiments of this application, multiple players may edit a virtual model object in a corresponding public scene, that is, they can arrange a virtual scene in a corresponding home, such as adding a lantern in the home.

An actual scene may also include, but is not limited to: player M entering a public scene can see player N editing a virtual model object at the home of player N and can also see player O editing a virtual model object at the home of player O.

In this embodiment, the virtual model object is edited by using dynamic block processing. The dynamic block processing is: a client ensures correctness of logic of the big world home and efficiency of rendering by separating collision data from the display effect.

Figure 11:
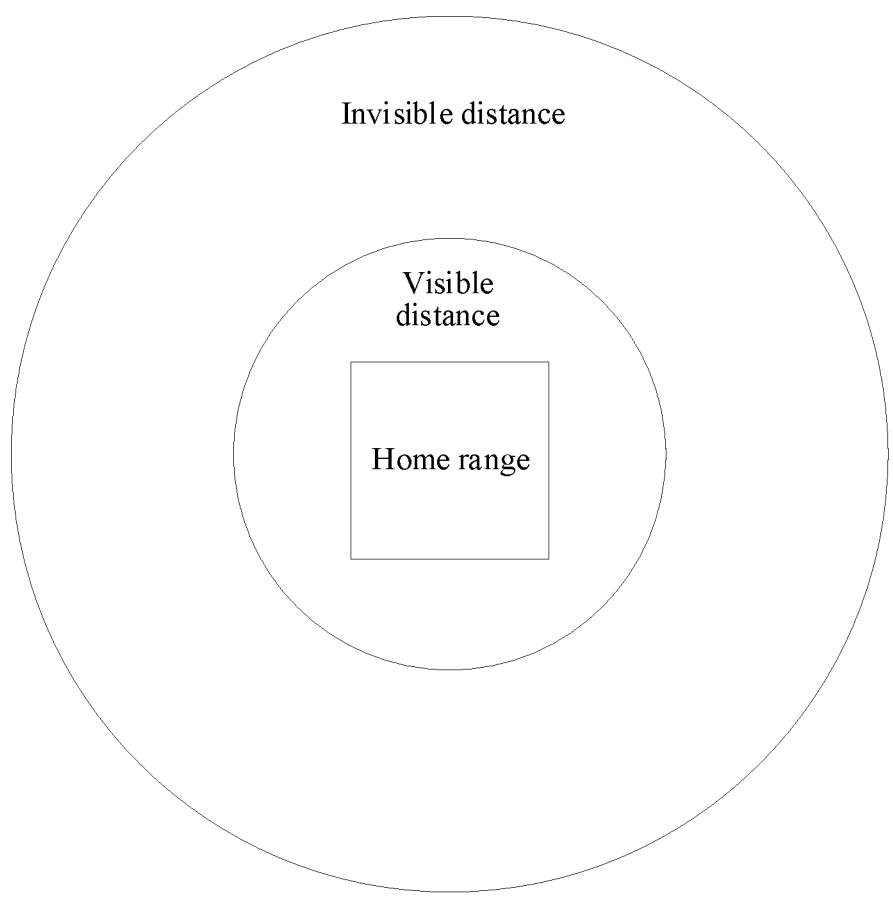
FIG. 11 is a schematic diagram of a data processing scope according to an embodiment.

In this embodiment, multiple ranges are defined by a rectangular area (equivalent to the target area), and this area may be used to reconstruct the collision data, so that once collision changes, only data in a corresponding area needs to be updated without refreshing collisions of the entire big world. Each area corresponds to a visible distance and an invisible distance. When the distance between a player and a home is less than the visible distance, model display of the custom articles is loaded. When the distance between the player and the home is greater than the visible range, no change occurs. Once the distance is greater than the invisible distance, all articles are deleted so as to ensure performance of the entire scene. If only one visible distance is defined, creation and deletion of articles will be frequently triggered when a player moves around the visible distance, resulting in experience and performance issues. FIG. 11 is a schematic diagram of a scope of data processing.

In this embodiment, after a player enters an area of the big world home, the system loads all collision data within a range of the home, and because these involve only data but no model display, the overhead is small, and the data can always be retained. When the player enters the area A, a model object is loaded, but when the player moves in the area B, nothing will occur. A previously created model object is deleted until the player leaves the area B.

In this embodiment, multiple home areas, and location and size of each of the home areas, are recorded in a fixed manner, and an "owner", that is, arrangement permissions, will be assigned for each area in the large world. After a virtual operation object in the game becomes the "owner" of a certain area, "whether the virtual operation object has entered the big world home area" is constantly determined during movement. If the virtual operation object is found to enter the home area, it is determined, according to the location of the home, which home the character has entered. Then, the character ID of the owner of this home is compared with that of the virtual operation object to determine whether they are same. If yes, it indicates that the virtual operation object has entered its own home area, and then a UI will switch to a home arrangement interface. Then the virtual operation object can start editing the big world home.

In existing MMORPGs, most of the public scenes of the games are fixed scenes that cannot be changed by players (e.g., scenic objects in the area or layouts of the area cannot be changed). On the contrary, the embodiments of this application enable players to freely change the performance of a scene in a public scene. A public scene of a massively multi-player game, as used herein, may refer to a main world of the game where any player of the game can enter and view a game scene of the main world. The player can also interact with a non-player character/object and another player in the game scene of the main world. A public scene of the game can be a place contrary to an instance dungeon of the game (e.g., a place that require a player to reach certain qualification or have an invitation before entering).

The embodiments of this application achieve a dynamic block function. When a scene model changes in real time, blocking data of a client side and a server side may also change in real time, so as to ensure basic sense of immersion of a player character in the scene. The target area in a large public scene can be arranged, and permissions to arrange such an area are granted to the player through a certain channel.

The method provided by this application directly increases freedom of MMORPG processing, while greatly improving freedom, exposure, and conspicuousness of home design processing, enabling players to manifest their individuality, enhancing participation enthusiasm of the players, and becoming one of the unparalleled characteristic elements in similar games.

For each of the foregoing method embodiments, for ease of description, the method embodiments are described as combinations of a series of actions. However, a person skilled in the art should learn that this application is not limited to the described order of actions, because according to this application, some steps may be performed in another order or at the same time. In addition, a person skilled in the art should understand that all the embodiments described in the specification are exemplary embodiments, and the related actions and modules are not necessarily mandatory to this application.

Figure 12:
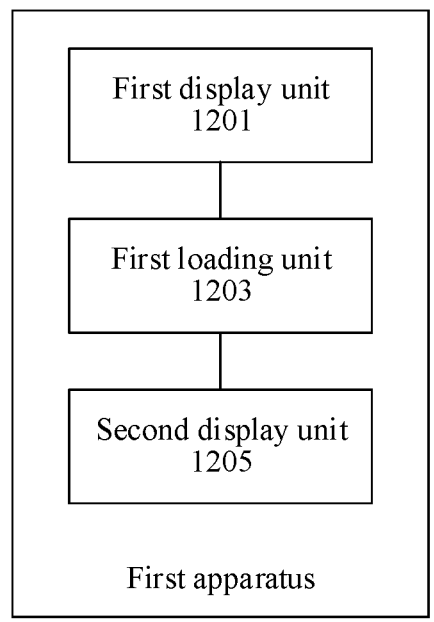
FIG. 12 is a schematic diagram of a structure of a display apparatus for a virtual scene according to an embodiment.

According to another aspect of the embodiments of this application, a display apparatus for a virtual scene used to implement the foregoing display method for a virtual scene is further provided, which is disposed in an electronic device. As shown in FIG. 12, the display apparatus for a virtual scene includes: a first display unit 1201, a first loading unit 1203, and a second display unit 1205.

The first display unit 1201 is configured to display a virtual scene in which a first virtual operation object is located.

The first loading unit 1203 is configured to load, when the first virtual operation object moves from the exterior of a first area to the interior of the first area, in the virtual scene, virtual model objects currently present in a target area, where the target area is located in the interior of the first area, and the target area is configured to allow multiple virtual operation objects to edit virtual model objects in the target area.

The second display unit 1205 is configured to display, in the virtual scene, a first group of virtual model objects located within a visual range of the first virtual operation object in the target area.

According to the embodiments of this application, the first display unit 1201 displays a virtual scene in which a first virtual operation object is located; the first loading unit 1203 loads, when the first virtual operation object moves from the exterior of a first area to the interior of the first area, in the virtual scene, virtual model objects currently present in a target area, where the target area is located in the interior of the first area, and the target area is configured to allow multiple virtual operation objects to edit virtual model objects in the target area; and the second display unit 1205 displays, in the virtual scene, a first group of virtual model objects located within a visual range of the first virtual operation object in the target area. That is, without the need for the virtual operation object to create its own separate private scene, the multiple virtual operation objects can edit the virtual model objects in the target area in a normal interactive virtual scene, and display virtual simulation objects in the target area according to the locations of the virtual operation objects. This significantly simplifies processing, enhances freedom and exposure of the virtual operation objects in editing the virtual model objects in the target area, and avoids limitations, so as to avoid loss of system resources caused by complex processing. In addition, system resources needed to create an additional separate private scene are also saved.

In an embodiment, the first area is located in the second area, and the apparatus may include:

a first data processing unit, configured to retain, when the first virtual operation object leaves the interior of the first area and is located in the interior of the second area, loaded target loading data, where the target loading data is loading data obtained by loading the virtual model objects currently present in the target area.

In an embodiment, the first area is located in the second area. The apparatus may include:

a deletion unit, configured to delete, when the first virtual operation object moves to the exterior of the second area, the target loading data, where the target loading data is loading data obtained by loading the virtual model objects currently present in the target area.

In an embodiment, the apparatus may include:

a loading unit, configured to: when the first virtual operation object is located in the interior of the first area and the virtual model object in the target area is updated by a second virtual operation object, load the updated virtual model object in the target area, or reload the virtual model objects currently present in the target area; and a third display unit, configured to display a second group of virtual model objects, where the second group of virtual model objects includes virtual model objects in the target area in which the virtual model object is updated, and located within the visual range of the first virtual operation object.

In an embodiment, the first area is located in the second area. The apparatus may include:

a second data processing unit, configured to retain, after the virtual model object in the target area is updated by a third virtual operation object, the loaded target loading data if the first virtual operation object is located in the exterior of the first area and the interior of the second area, where the target loading data is loading data obtained by loading virtual model objects currently present in the target area; and a fourth display unit, configured to display a third group of virtual model objects, where the third group of virtual model objects includes virtual model objects in a target area before the updating and located within the visual range of the first virtual operation object.

In an embodiment, the apparatus may include:

a detecting unit, configured to detect, when the first virtual operation object moves from the exterior of the target area to the interior of the target area, whether the first virtual operation object has editing permissions for the target area;

a fifth display unit, configured to display, when the first virtual operation object has editing permissions for the target area, a first area arrangement interface, where the first area arrangement interface is configured to allow the first virtual operation object, in the first area arrangement interface, to edit the virtual model object in the target area;

an obtaining unit, configured to obtain, in the first area arrangement interface, a first edit instruction of the first virtual operation object; and a response unit, configured to update, in response to the first edit instruction, the virtual model objects currently present in the target area to a first virtual model object set.

In an embodiment, the apparatus may include:

a sixth display unit, configured to display, after the first virtual operation object completes editing the virtual model object in the target area, a fourth group of virtual model objects, where the fourth group of virtual model objects includes virtual model objects in the first virtual model object set and located within the visual range of the first virtual operation object.

In an embodiment, the apparatus may include:

a second loading unit, configured to: when the first virtual operation object is located in the interior of the first area and the first virtual model object set is updated to a second virtual model object set by a fourth virtual operation object, load the updated virtual model object in the target area, or, reload the second virtual model object set currently present in the target area; and a seventh display unit, configured to display a fifth group of virtual model objects, where the fifth group of virtual model objects includes virtual model objects in the second virtual model object set and located within the visual range of the first virtual operation object.

In an embodiment, the first area is located in the second area. The apparatus may include:

a third loading unit, configured to load, when the first virtual operation object moves from the exterior of the second area to the interior of the second area, collision data in the target area, where the collision data is used to represent a collision area of the virtual model objects currently present in the target area.

In an embodiment, the apparatus may include:

a division unit, configured to divide the target area into N target subareas, where N is a positive integer greater than 1; and a setting unit, configured to set each of the N target subareas to allow a corresponding virtual operation object to edit a virtual model object in the target subarea.

Figure 13:
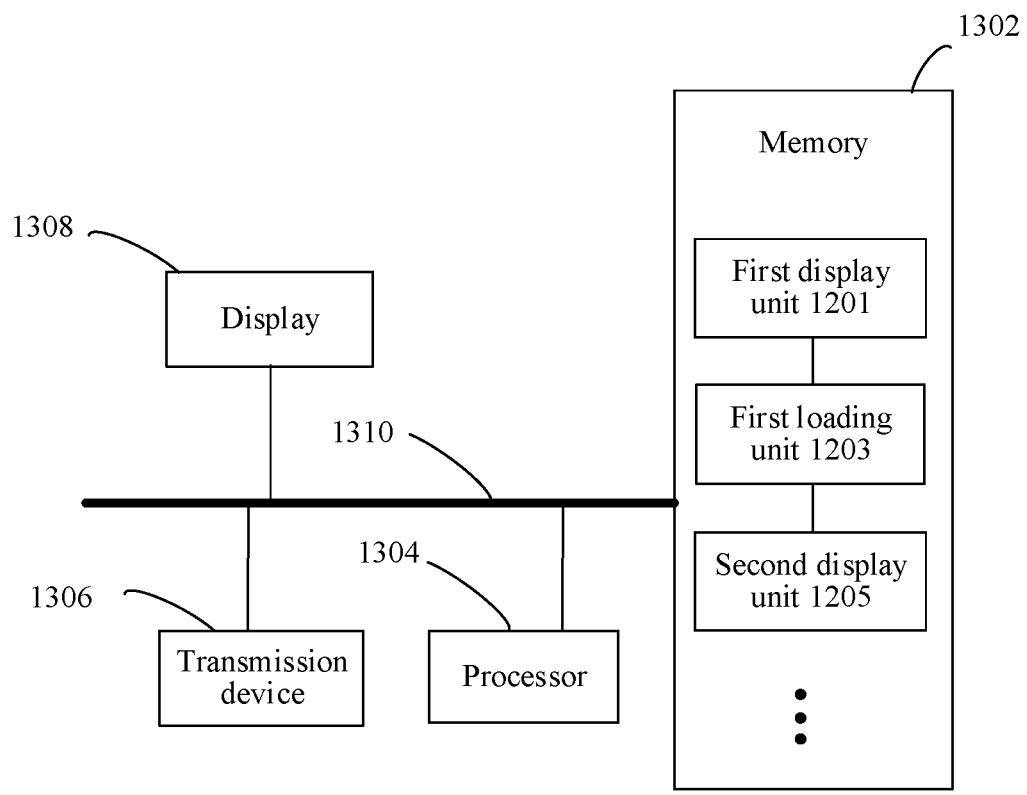
FIG. 13 is a schematic diagram of a structure of an electronic device for a display method for a virtual scene according to an embodiment.

According to still another aspect of the embodiments of this application, an electronic device used to implement the foregoing display method for a virtual scene is further provided. The electronic device may be a terminal device or a server as shown in FIG. 1. For example, the electronic device is a server in this embodiment. As shown in FIG. 13, the electronic device includes a memory 1302 and a processor 1304. The memory 1302 stores computer-readable instructions, and the processor 1304 is configured to perform the steps in any one of the foregoing method embodiments by running the computer-readable instructions.

In an embodiment, the electronic device may be disposed in at least one network device of multiple network devices of a computer network.

In an embodiment, the processor may be configured to perform the following steps by running the computer-readable instructions:

S1. Display, in a target game application, a game screen showing a first virtual operation object;

S2. Load, when the first virtual operation object moves from the exterior of a first area to the interior of the first area, in the target game application, virtual model objects currently present in a target area, where the target area is located in the interior of the first area, and the target area is configured to allow multiple virtual operation objects to edit virtual model objects in the target area; and S3. Display, in the target game application, a first group of virtual model objects located within a visual range of the first virtual operation object in the target area.

In an embodiment, a person of ordinary skill in the art may understand that, the structure shown in FIG. 13 is only illustrative. The electronic equipment or electronic device may be a terminal device such as a smartphone (such as an Android mobile phone or an iOS mobile phone), a tablet computer, a palmtop computer, a MID, or a PAD. FIG. 13 does not limit the structure of the foregoing electronic equipment or electronic device. For example, the electronic equipment or electronic device may include more or fewer components (such as a network interface and the like) than those shown in FIG. 13, or may have a configuration different from that shown in FIG. 13.

The memory 1302 may be used to store a software program and a module, such as computer-readable instructions/modules corresponding to the display method and the apparatus for a virtual scene according to the embodiments of this application, and the processor 1304 performs various functional applications as well as data processing by running the software computer-readable instructions and modules stored in the memory 1302, that is, implements the display method for a virtual scene. The memory 1302 may include a high-speed random memory, and may also include a non-volatile memory, for example, one or more magnetic storage apparatuses, a flash memory, or another nonvolatile solid-state memory. In some embodiments, the memory 1302 may further include memories remotely disposed relative to the processor 1304, and the remote memories may be connected to a terminal through a network. Examples of the network include, but are not limited to, the Internet, an intranet, a local area network, a mobile communication network, and a combination thereof. The memory 1302 specifically may be, but is not limited to, used for information such as identification information of a first virtual object, the virtual model object, and a first group of virtual model objects within the visual range of the first virtual object. As an example, as shown in FIG. 13, the memory 1302 may include, but is not limited to, the first display unit 1201, the first loading unit 1203, and the second display unit 1205 in the foregoing display apparatus for a virtual scene. In addition, the memory 1302 may further include, but is not limited to, other modules and units in the foregoing display apparatus for a virtual scene, and details are not described herein again in this example.

In an embodiment, a transmission device 1306 is used to receive or transmit data via a network. Specific examples of the network may include a wired network and a wireless network. In an example, the transmission device 1306 includes a network interface controller (NIC). The NIC may be connected to another network device and a router by using a network cable, so as to communicate with the Internet or a local area network. In an example, the transmission device 1306 is a radio frequency (RF) module, which communicates with the Internet in a wireless manner.

In addition, the electronic device further includes: a display 1308, configured to display the first group of virtual model objects within the visual range of the first virtual operation object; and a connection bus 1310, used to connect various module components in the electronic device.

In other embodiments, the foregoing terminal device or server may be a node in a distributed system. The distributed system may be a blockchain system. The blockchain system may be a distributed system formed by multiple nodes connected in the form of network communication. The nodes may form a peer to peer (P2P) network, and a computing device in any form such as a server, a terminal or another electronic device may become a node in the blockchain system by joining the P2P network.

According to still another aspect of the embodiments of this application, a computer-readable storage medium is further provided. The computer-readable storage medium stores computer-readable instructions, the computer-readable instructions being configured to, when running, perform the steps in any one of the foregoing method embodiments.

In an embodiment, the computer-readable storage medium is configured to store the computer-readable instructions used to perform the following steps:

S1. Display, in a target game application, a game screen showing a first virtual operation object;

S2. Load, when the first virtual operation object moves from the exterior of a first area to the interior of the first area, in the target game application, virtual model objects currently present in a target area, where the target area is located in the interior of the first area, and the target area is configured to allow multiple virtual operation objects to edit virtual model objects in the target area; and S3. Display, in the target game application, a first group of virtual model objects located within a visual range of the first virtual operation object in the target area.

In an embodiment, a person of ordinary skill in the art may understand that all or some of the steps of the methods in the foregoing embodiments may be implemented by a computer-readable instruction instructing relevant hardware of a terminal device. The computer-readable instruction may be stored in the computer-readable storage medium. The storage medium may include: a flash disk, a read-only memory (ROM), a random access memory (RAM), a magnetic disk, an optical disc, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the prior art, or all or some of the technical solutions may be presented in the form of a software product. The computer software product is stored in the storage medium, and includes several instructions for instructing one or more computer devices (which may be a personal computer, a server, a network device, or the like) to perform all or some of the steps of the methods described in the embodiments of the present invention.

In the foregoing embodiments of this application, the descriptions of the embodiments have different focuses. For a part that is not detailed in an embodiment, reference may be made to the relevant description of other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The unit described as a separate component may or may not be physically separated, and a component displayed as a unit may or may not be a physical unit, that is, the component may be located in one place or may be distributed to multiple network units. Some or all of these units can be selected according to an actual need to achieve purpose of a solution of this embodiment.

In addition, each functional unit in each embodiment of the present invention may be integrated in a single processing unit, or each unit may physically exist separately, or two or more units may be integrated in a single unit. The integrated unit can be implemented either in the form of hardware or a software functional unit.

The above descriptions are merely preferred embodiments of this application, and a person of ordinary skill in the art may make various improvements and modifications without departing from the principle of this application. All such improvements and modifications shall also fall within the protection scope of this application.

What is claimed is:

1. A display method for a virtual scene, performed by an electronic device, comprising:
   displaying a virtual scene of a game in which a first virtual operation object is located;
   when the first virtual operation object moves from an exterior of a first area to an interior of the first area, loading, in the virtual scene, virtual model objects currently present in a target area, the target area being located in the interior of the first area, and the target area being configured to allow multiple virtual operation objects to edit virtual model objects in the target area, wherein the target area is allocated by a game system from a public scene in the game without the first virtual operation object creating its own separate scene; and
   displaying, in the virtual scene, a first group of virtual model objects located within a visual range of the first virtual operation object in the target area.

2. The method according to claim 1, wherein the first area is located in a second area, the method further comprising:
   retaining, when the first virtual operation object leaves the interior of the first area and is located in an interior of the second area, loaded target loading data, wherein the target loading data is obtained by loading the virtual model objects currently present in the target area.

3. The method according to claim 1, wherein the first area is located in a second area, the method further comprising:
   deleting, when the first virtual operation object moves to an exterior of the second area, target loading data.

4. The method according to claim 1, further comprising:
   when the first virtual operation object is located in the interior of the first area and a virtual model object in the target area is updated by a second virtual operation object, loading the updated virtual model object in the target area, or, reloading the virtual model objects currently present in the target area; and
   displaying a second group of virtual model objects, wherein the second group of virtual model objects comprises virtual model objects in the target area and located within the visual range of the first virtual operation object.

5. The method according to claim 1, wherein the first area is located in a second area, the method further comprising:
   retaining, after a virtual model object in the target area is updated by a third virtual operation object, loaded target loading data if the first virtual operation object is located in the exterior of the first area and in an interior of the second area; and
   displaying a third group of virtual model objects, wherein the third group of virtual model objects comprises virtual model objects in the target area before the updating and located within the visual range of the first virtual operation object.

6. The method according to claim 1, further comprising:
   displaying, when the first virtual operation object moves from an exterior of the target area to an interior of the target area and the first virtual operation object has editing permissions for the target area, a first area arrangement interface, wherein the first area arrangement interface is configured to allow the first virtual operation object to edit, in the first area arrangement interface, the virtual model objects in the target area;
   obtaining, in the first area arrangement interface, a first edit instruction of the first virtual operation object; and
   updating, in response to the first edit instruction, the virtual model objects currently present in the target area to a first virtual model object set.

7. The method according to claim 6, further comprising:
   displaying, after the first virtual operation object completes editing the virtual model object in the target area, a fourth group of virtual model objects, wherein the fourth group of virtual model objects comprises virtual model objects in the first virtual model object set and located within the visual range of the first virtual operation object.

8. The method according to claim 7, further comprising:
   when the first virtual operation object is located in the interior of the first area and the first virtual model object set is updated to a second virtual model object set by a fourth virtual operation object, loading one or more virtual model objects in the target area that have been updated by the fourth virtual operation object, or reloading the second virtual model object set currently present in the target area; and
   displaying a fifth group of virtual model objects, wherein the fifth group of virtual model objects comprises virtual model objects in the second virtual model object set and located within the visual range of the first virtual operation object.

9. The method according to claim 1, wherein the first area is located in a second area, the method comprising:
   loading, when the first virtual operation object moves from an exterior of the second area to an interior of the second area, collision data in the target area, wherein the collision data represents a collision area of the virtual model objects currently present in the target area.

10. The method according to claim 1, comprising:
    dividing the target area into N target subareas, wherein N is a positive integer greater than 1, and
    configuring each of the target subareas to allow a corresponding virtual operation object to edit a virtual model object in the target subarea.

11. A display apparatus for a virtual scene, comprising: a memory and a processor, the memory storing computer-readable instructions, and the processor being configured, when executing the computer-readable instructions, to:
    display a virtual scene of a game in which a first virtual operation object is located;
    load, when the first virtual operation object moves from an exterior of a first area to an interior of the first area, in the virtual scene, virtual model objects currently present in a target area, the target area being located in the interior of the first area, and the target area being configured to allow multiple virtual operation objects to edit virtual model objects in the target area, wherein the target area is allocated by a game system from a public scene in the game without the first virtual operation object creating its own separate scene; and display, in the virtual scene, a first group of virtual model objects located within a visual range of the first virtual operation object in the target area.

12. The apparatus according to claim 11, wherein the first area is located in a second area, the processor is further configured to:

retain, when the first virtual operation object leaves the interior of the first area and is located in an interior of the second area, loaded target loading data, wherein the target loading data is obtained by loading the virtual model objects currently present in the target area.

13. The apparatus according to claim 11, wherein the first area is located in a second area, the processor is further configured to:

delete, when the first virtual operation object moves to the exterior of the second area, target loading data.

14. The apparatus according to claim 11, wherein the processor is further configured to:

when the first virtual operation object is located in the interior of the first area and the virtual model object in the target area is updated by a second virtual operation object, load the updated virtual model object in the target area, or reload the virtual model objects currently present in the target area; and display a second group of virtual model objects, wherein the second group of virtual model objects comprises virtual model objects in the target area and located within the visual range of the first virtual operation object.

15. The apparatus according to claim 11, wherein the first area is located in a second area, and the processor is further configured to:

retain, after a virtual model object in the target area is updated by a third virtual operation object, loaded target loading data if the first virtual operation object is located in the exterior of the first area and in an interior of the second area; and display a third group of virtual model objects, wherein the third group of virtual model objects comprises virtual model objects in the target area before the updating and located within the visual range of the first virtual operation object.

16. The apparatus according to claim 11, wherein the processor is further configured to:

display, when the first virtual operation object moves from an exterior of the target area to an interior of the target area and the first virtual operation object has editing permissions for the target area, a first area arrangement interface, wherein the first area arrangement interface is configured to allow the first virtual operation object to edit, in the first area arrangement interface, the virtual model objects in the target area;

obtain, in the first area arrangement interface, a first edit instruction of the first virtual operation object; and update, in response to the first edit instruction, the virtual model objects currently present in the target area to a first virtual model object set.

17. The apparatus according to claim 16, wherein the processor is further configured to:

display, after the first virtual operation object completes editing the virtual model object in the target area, a fourth group of virtual model objects, wherein the fourth group of virtual model objects comprises virtual model objects in the first virtual model object set and located within the visual range of the first virtual operation object.

18. One or more non-transitory computer-readable storage media, the computer-readable storage media comprising computer-readable instructions stored therein, and the computer-readable instructions, when running by a processor, cause the processor to perform:

displaying a virtual scene in which a first virtual operation object is located;

when the first virtual operation object moves from an exterior of a first area to an interior of the first area, loading, in the virtual scene, virtual model objects currently present in a target area, the target area being located in the interior of the first area, and the target area being configured to allow multiple virtual operation objects to edit virtual model objects in the target area;

displaying, in the virtual scene, a first group of virtual model objects located within a visual range of the first virtual operation object in the target area;

retaining, after a virtual model object in the target area is updated by a virtual operation object other than the first virtual operation object, loaded target loading data if the first virtual operation object is located in the exterior of the first area and in an interior of a second area, wherein the first area is located in the second area; and displaying a target group of virtual model objects, wherein the target group of virtual model objects comprises virtual model objects in the target area before the updating and located within the visual range of the first virtual operation object.

19. The method according to claim 1, wherein:

the target area includes a plurality of subareas allocated by the game system from the public scene, and arrangement permissions for virtual model objects in two of the plurality of subareas belong to two different virtual operation objects.

20. The method according to claim 1, wherein:

the virtual model objects exist in the target area before the first virtual operation object enters the target area.

* * * * *